(12) United States Patent
Goel et al.

(10) Patent No.: US 10,970,312 B2
(45) Date of Patent: Apr. 6, 2021

(54) CONTENT RESONANCE

(71) Applicant: Twitter, Inc., San Francisco, CA (US)

(72) Inventors: Ashish Goel, Palo Alto, CA (US); Srinivasan Rajgopal, Sunnyvale, CA (US); Utkarsh Srivastava, Menlo Park, CA (US); Anamitra Banerji, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 168 days.

(21) Appl. No.: 16/208,410

(22) Filed: Dec. 3, 2018

(65) Prior Publication Data

US 2019/0179833 A1 Jun. 13, 2019

Related U.S. Application Data

(63) Continuation of application No. 15/385,407, filed on Dec. 20, 2016, now Pat. No. 10,146,855, which is a
(Continued)

(51) Int. Cl.
| | |
|---|---|
| *G06F 16/28* | (2019.01) |
| *G06F 16/21* | (2019.01) |
| *G06F 16/23* | (2019.01) |
| *G06F 16/2457* | (2019.01) |
| *G06F 16/35* | (2019.01) |

(Continued)

(52) U.S. Cl.
CPC .......... *G06F 16/285* (2019.01); *G06F 16/219* (2019.01); *G06F 16/23* (2019.01); *G06F 16/2322* (2019.01); *G06F 16/24578* (2019.01); *G06F 16/35* (2019.01); *H04L 51/04* (2013.01); *H04L 51/12* (2013.01);
(Continued)

(58) Field of Classification Search
CPC ........ G06F 16/285; G06F 16/23; G06F 16/35; G06F 16/219; G06F 16/2322; G06F 16/24578; G06F 16/24524; G06F 16/24545; G06Q 10/10; H04L 51/04; H04L 51/12
USPC ......................................................... 707/732
See application file for complete search history.

(56) References Cited

U.S. PATENT DOCUMENTS

| | | |
|---|---|---|
| 6,546,378 B1 | 4/2003 | Cook |
| 7,478,129 B1 | 1/2009 | Chemtob |
| (Continued) | | |

OTHER PUBLICATIONS

United States Office Action, U.S. Appl. No. 13/433,217, dated Mar. 21, 2013, 13 pages.
(Continued)

*Primary Examiner* — Kuen S Lu
(74) *Attorney, Agent, or Firm* — Fish & Richardson P.C.

(57) ABSTRACT

A real-time messaging platform and method is disclosed which classifies messages in accordance with a combination of user engagement events as modified to reflect the temporal structure of the user engagement events. A message can be assigned a metric based, for example, on a weighted combination of user engagement rates, decayed with time to reflect an intuition that recent interactions by one or more users with the message will have a greater impact than older interactions with the message. Different types of interaction by one or more users with the message can be assigned different weights when the different engagement events are combined and, also, can be assigned different temporal characteristics.

36 Claims, 6 Drawing Sheets

Related U.S. Application Data continuation of application No. 15/045,154, filed on Feb. 16, 2016, now Pat. No. 9,524,321, which is a continuation of application No. 13/975,515, filed on Aug. 26, 2013, now Pat. No. 9,298,812, which is a continuation of application No. 13/433,217, filed on Mar. 28, 2012, now Pat. No. 8,682,895.

(60) Provisional application No. 61/470,385, filed on Mar. 31, 2011.

(51) Int. Cl.
*H04L 12/58* (2006.01)
*G06F 16/2452* (2019.01)
*G06F 16/2453* (2019.01)
*G06Q 10/10* (2012.01)

(52) U.S. Cl.
CPC .. *G06F 16/24524* (2019.01); *G06F 16/24545* (2019.01); *G06Q 10/10* (2013.01)

(56) References Cited

U.S. PATENT DOCUMENTS

| | | | |
|---|---|---|---|
| 7,624,125 B2 * | 11/2009 | Feinsmith | G06Q 10/10 |
| 7,805,421 B2 | 9/2010 | Grichnik et al. | |
| 8,365,138 B2 * | 1/2013 | Iborra | G06F 8/30 |
| | | | 717/104 |
| 2002/0131565 A1 | 9/2002 | Scheuring et al. | |
| 2004/0054542 A1 | 3/2004 | Foote et al. | |
| 2004/0083131 A1 | 4/2004 | Kaufman et al. | |
| 2005/0076046 A1 * | 4/2005 | Goldsack | G06F 17/30504 |
| 2005/0144075 A1 | 6/2005 | Magowan et al. | |
| 2006/0055696 A1 | 3/2006 | Loberg | |
| 2006/0101351 A1 | 5/2006 | Cowham | |
| 2007/0136235 A1 | 6/2007 | Hess | |
| 2007/0220010 A1 | 9/2007 | Ertugrul | |
| 2007/0294203 A1 | 12/2007 | Seitz | |
| 2008/0120129 A1 * | 5/2008 | Seubert | G06Q 10/06 |
| | | | 705/35 |
| 2008/0235084 A1 | 9/2008 | Quoc et al. | |
| 2009/0150214 A1 | 6/2009 | Mohan | |
| 2009/0307318 A1 | 12/2009 | Chappell et al. | |
| 2010/0005061 A1 | 1/2010 | Basco et al. | |
| 2010/0312769 A1 * | 12/2010 | Bailey | G06F 17/30705 |
| | | | 707/740 |
| 2011/0022465 A1 * | 1/2011 | Malleshaiah | G06Q 30/02 |
| | | | 705/14.54 |
| 2011/0040751 A1 | 2/2011 | Chandrasekar et al. | |
| 2011/0071898 A1 | 3/2011 | Feng et al. | |
| 2011/0103682 A1 | 5/2011 | Chidlovskii et al. | |
| 2011/0161164 A1 | 6/2011 | Anderson | |
| 2011/0238487 A1 * | 9/2011 | Chang | G06Q 10/06375 |
| | | | 705/14.42 |
| 2012/0054020 A1 | 3/2012 | Jacobs | |
| 2012/0290924 A1 | 11/2012 | Vick et al. | |

OTHER PUBLICATIONS

United States Office Action, U.S. Appl. No. 13/975,515, dated Mar. 3, 2015, 16 pages.
United States Office Action, U.S. Appl. No. 13/975,515, dated Sep. 17, 2014, 21 pages.
United States Office Action, U.S. Appl. No. 14/213,367, dated Apr. 16, 2015, 13 pages.
United States Office Action, U.S. Appl. No. 14/213,367, dated Oct. 27, 2014, 11 pages.
United States Office Action, U.S. Appl. No. 15/077,847, dated May 4, 2017, 26 pages.

* cited by examiner

CONTENT RESONANCE

CROSS-REFERENCE TO RELATED APPLICATION

This application is a continuation of U.S. application Ser. No. 15/385,407, filed Dec. 20, 2016, now U.S. Pat. No. 10,146,855, which is a continuation of U.S. application Ser. No. 15/045,154, filed Feb. 16, 2016, now U.S. Pat. No. 9,524,321, which is a continuation of U.S. application Ser. No. 13/975,515, filed Aug. 26, 2013, now U.S. Pat. No. 9,298,812, which is a continuation of U.S. application Ser. No. 13/433,217, filed Mar. 28, 2012, now U.S. Pat. No. 8,682,895, which application claims the benefit of U.S. Provisional Application No. 61/470,385, filed Mar. 31, 2011, all of which are hereby incorporated by reference in their entirety.

BACKGROUND

Field of Disclosure

The disclosure generally relates to the field of serving electronic content, in particular to classifying messages in a real-time messaging platform.

Description of the Related Art

An online content consumer today is inundated with content. Accordingly, determining and serving select content to the consumer is valuable. Many content publishers understand this value and therefore invest considerable resources in classifying content for a user. For example, a search engine determines content for an online consumer based on relevance to keywords provided by the consumer. Similarly, an email service may search a user's inbox and attempt to prioritize messages based on keywords or based on the sender of the message.

SUMMARY

A real-time messaging platform and method is disclosed which classifies messages in accordance with a combination of user engagement events as modified to reflect the temporal structure of the user engagement events. In accordance with an embodiment of the invention, a message can be assigned a metric based, for example, on a weighted combination of user engagement rates, decayed with time to reflect an intuition that recent interactions by one or more users with the message will have a greater impact than older interactions with the message. In accordance with another embodiment of the invention, different types of interaction by one or more users with the message can be assigned different weights when the different engagement events are combined and, also, can be assigned different temporal characteristics.

In accordance with another embodiment of the invention, the metric assigned to a message can be updated in real-time by temporally diluting the effect of previous engagement events in a current metric before updating the metric with one or more new engagement events, thereby facilitating rapid processing of new messages. In accordance with another embodiment of the invention, a message can be provided a threshold of exploratory impressions to attract user engagement events and assist in constructing an initial metric for message classification.

The disclosed message classification technique can be utilized by the real-time messaging platform, for example, to determine which messages or the arrangement of messages to display to a user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

Figure (FIG. 1 is a block diagram illustrating a computing environment for determining the content's resonance according to one embodiment of the present disclosure.

DETAILED DESCRIPTION

The computing environment described herein enables classification of messages in a real-time messaging platform in accordance with a combination of user engagement events as modified to reflect the temporal structure of the user engagement events. The Figures (Figs.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
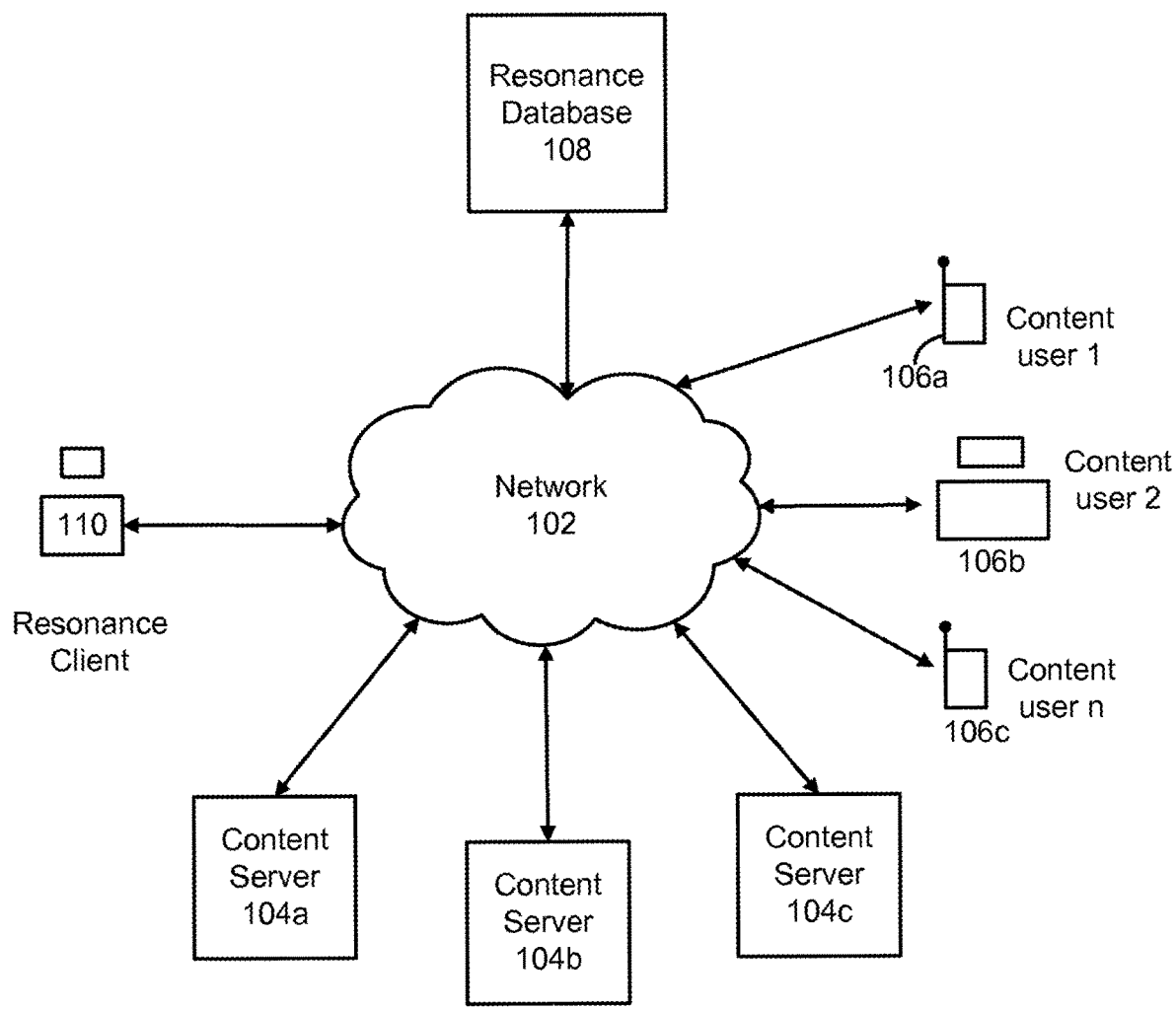

Referring to FIG. 1, the computing environment for determining the content's resonance comprises content servers 104a-c, resonance database 108, content user clients 106a-c and network 102. The concept of a content's "resonance" is a new concept introduced herein which classifies content in accordance with a combination of user engagement events as modified to reflect the temporal structure of the user engagement events, as further described herein. The served content's resonance can be considered an indicator of how well the content has resonated with its intended users. As further described herein, the resonance can be based on various factors like how and when the users interact with the served content.

The computing environment can include resonance client 110. The resonance client 110 is a computing device with a processor and a memory capable of providing a graphical user interface for requesting and viewing the served content's resonance. An example computing device is described with respect to FIG. 6.

Each of the content user clients 106a-c (collectively referred to as "content user client 106") is a computing device with a processor and a memory that provides users with an interface to receive and interact with content. Examples of clients 106 include a desktop, a laptop and a handheld computing device. An example computing device is described with respect to FIG. 6.

Each of the content servers 104a-c (collectively referred to as "content server 104") is a computing device with a processor and a memory that receives requests for content from various content user clients 106 and transmits the content to the requesting clients 106. An example computing device is described with respect to FIG. 6. Additionally, the content server 104 tracks how and when a user interacts with the received content and determines the content's resonance based on the tracked information. For example, the content server 104 determines when a first user through client 106a hovers over an embedded link in the received content. Based on the particular time and the particular action of the first user, the content server 104 determines the content's resonance. Next, the content server 104 repeats the same process when a second user clicks on the embedded link or performs another action on the content through client 106b. The content server 104 is described further below.

The resonance database 108 is a computing device with a processor and a memory that stores information shared by content servers 104 collectively. The content servers 104 operate collectively to serve a large number of clients 106. In one embodiment, each content server 104 individually determines the content's resonance based on the type and time of user interaction recorded by the individual content server 104. These individual determinations distribute the load and avoid the latencies associated with a central entity collecting all the necessary data and determining the resonance value accessed by all content servers 104. However, such individual determinations require a content server 104 to also account for type and time of user interactions being recorded by other content servers 104. The resonance database 108 stores information that assists the content servers 104 to individually determine resonance values and also account for type and time of user interactions being recorded by other servers.

Examples of such information include an impression total representing the combined total number of times an impression of a content file is viewed by various users through their clients 106, the impression update time when the impression total was last updated by a content server 104, a positive interaction total representing the total number of times the users have interacted with the content beyond just viewing the content, and the interaction update time when the positive interaction total was updated by a content server 104.

In one embodiment, every time a content server 104 reads the impression total and the positive interaction total from the resonance database 108, the content server 104 decays the read totals. Such decayed totals beneficially give more weight to the current impression and positive interaction as compared to the previous impressions and interactions. Accordingly, every time these totals are read, the totals are first decayed based on the amount of time passed since the last update. The decayed totals are then updated to account for the new impression or positive interaction. These updated totals and their time of update are then written by the content server 104 to the resonance database 108. This information is read and updated by various content servers 104 to keep the content servers 104 synchronized with each other. The use of this information in synchronizing the content servers 104 is described further below.

The network 102 represents the communication pathways between the resonance client 110, content servers 104, content user clients (or client systems) 106 and resonance database 108. In one embodiment, the network 102 is the Internet. The network 102 can also use dedicated or private communications links that are not necessarily part of the Internet.

Operational Overview

An originating user uploads content, views content and transmits content to two other users through a messaging service or another application on content user client 106a. The content server 104a tracks the originating user's interaction with the content and the content server 104b tracks the two recipient's interaction with the received content. When the originating user views and forwards the content through user client 106a, the originating client 106a transmits data to the content server 104a indicating that the originating user has viewed and forwarded the content. The content server 104a receives the data, determines the time the originating user forwarded the content, and determines the content's resonance based on the forwarding action.

To determine resonance, the content server 104a reads the positive interaction total, the interaction update time, the impression total and the interaction update time from the resonance database 108. Because the originating user is the first to view the content and perform a positive action, i.e., an action other than viewing the content, all the values read from resonance database 108 are zero. The content server 104a next decays the read totals. Because the read totals are at their respective minimums, decaying them does not change their value. The content server 104a increments the impression total by one and the positive interaction total by the action weight associated with the forwarding action. Additionally, the content server 104a updates the impression update time and interaction update time to reflect the time of current update. Next, the content server 104a writes the updated values to the resonance database 108.

In one embodiment, the content server 104a maintains a local copy of the updated totals. These local copies are used to determine the content's resonance. For example, the content server 104a uses the local copies of the totals to determine the content's resonance in response to receiving a request for content's resonance from resonance client 110. The local copies beneficially enable a content provider to determine the content's resonance without fetching the values from a central database and thus avoiding latencies involved with accessing and retrieving data. In another embodiment, the content server 104a does not maintain the local copies and fetches the totals from the resonance database 108 whenever the content server 104 determines the content's resonance.

Regardless of how the content server 104a determines the content's resonance, the content server 104a forwards the content to its two intended users (or recipients). The first intended recipient views the content through client 106b some time, for e.g. five minutes, after the originating user forwards the content. The first intended recipient views the content and performs no further action on the content. The client 106b transmits data to content server 104b indicating that the first recipient has interacted with, e.g., viewed or selected, the content. The content server 106b receives the data, retrieves the positive interaction total, the impression total, and their respective update times from resonance database 108. Next, the content server 106b decays the two retrieved totals based on the amount of time, e.g. five minutes, elapsed since the last update made to the totals. The decayed impressions total is then increased by one and the positive interaction total is not increased any further because the first intended recipient did not perform a positive action on the content. The content server 104b then writes the decayed and updated values along with their respective update times to the resonance database 108.

After another time interval, e.g. two minutes, the second intended user interacts with, e.g. selects or views, the content sent by the originating user and replies to the originating user through client 106c. The client 106c transmits data to content server 104b indicating the second recipient's action. The content server 104b then performs similar steps as described above for the first recipient above. However, unlike the first recipient, the second recipient has performed a positive action of replying based on the received content. Accordingly, the positive interaction total is updated by the weight associated with the replying action.

In this manner, the content servers 104 beneficially account for various users' interaction with the content when determining the content's resonance. Additionally, the content servers 104 do not account for only the total number of user interaction but also weigh different user interactions differently. Moreover, in one embodiment, the content servers 104 also beneficially account for the recency of an interaction. The more recent a user's interaction with the content, the more weight it is given in determining the content's resonance.

Upon reading this disclosure, one of ordinary skill in the art will understand that the description above includes two content servers 104 for the purposes of illustration. In other embodiments, one content server 104 can serve content to and track interactions of various users. In such embodiments, the content server 104 does not synchronize with other servers. Accordingly, the content server 104 does not store in or retrieve from the resonance database 108 the above mentioned information and instead maintains copies of such information in local memory.

Content Server 104

Figure 2:
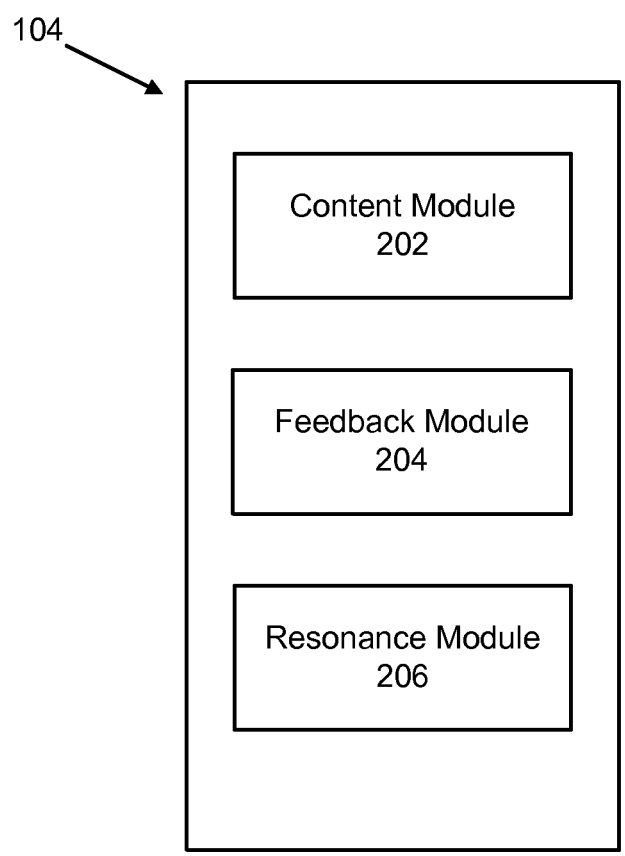
FIG. 2 is a block diagram illustrating a content server according to one embodiment of the present disclosure.

FIG. 2 is a block diagram illustrating the content server 104 according to one embodiment of the present disclosure. The content server 104 comprises a content module 202, a feedback module 204 and a resonance module 206.

The content module 202 receives request for the content from client 106 and transmits the requested content to client 106. Additionally, the content module 202 also receives from client 106a a request to forward the content to client 106b. Accordingly, the content module 202 determines the content server 104 associated with client 106b and forwards the request to the determined content server 104. The content module 202 in the determined content server later transmits the forwarded content to client 106b.

The feedback module 204 communicates with client 106 to determine whether the content's impression was rendered on client 106, to determine the action performed by a user on the received content and to determine the time the action was performed. Examples of user actions includes hover view (i.e., moving the cursor over a link or another part of the content), hashtag click (i.e., adding context data or metadata for the content), URL click (i.e., selecting a link in the content), profile click (i.e., selecting a link to view the content's sender's profile), forwarding the content to other users, replying to the content sender, marking the received content as favorite, and/or subscribing to the sender's profile to receive additional messages from the sender.

Figure 3:
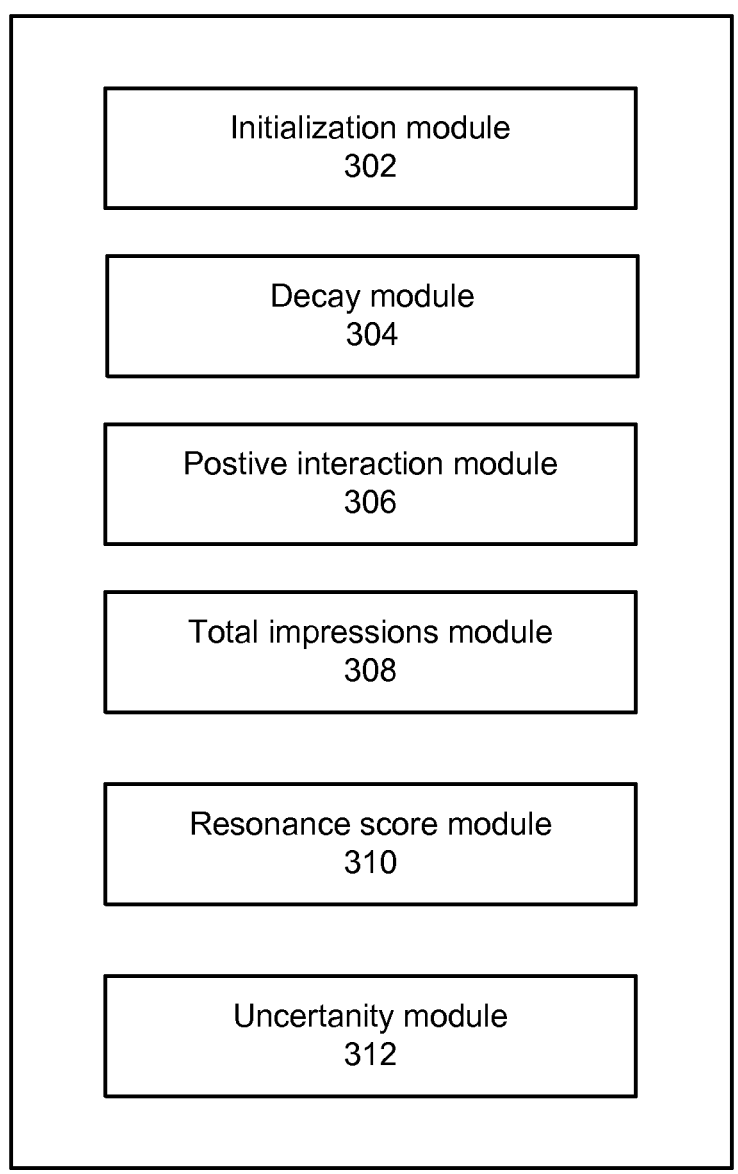
FIG. 3 is a block diagram illustrating a resonance module according to one embodiment of the present disclosure.

The resonance module 206 determines the content's resonance. Optionally, the resonance module 206 updates the resonance database 108 in embodiments where the content server 104 synchronizes with other content servers 104. Referring to FIG. 3, the resonance module 206 comprises an initialization module 302, a decay module 304, a positive interaction module 306, a total impressions module 308, a resonance score module 310 and an uncertainty module 312.

The initialization module 302 determines whether users have previously interacted with content. If not, the initialization module 302 initializes for the content various values like positive interaction total, interaction update time, impression total and impression update time. The initialization module 302 queries the resonance database 108 to determine whether these values exist for the content. If not, the initialization module 302 initializes these values. In one embodiment, the initialization module 302 initializes all these values to zero.

The decay module 304 retrieves from the resonance database 108 the positive interaction total, interaction update time, impression total and impression update time. Next, the decay module 304 adjusts or decays (i.e., dilutes) the positive interaction total based on the current time and the interaction update time. Similarly, the decay module 304 adjusts or decays the impression total based on the current time and the impression update time. In one embodiment, the decay module 304 decays the impression total according to the following formula:

$m_{updated} = m_{prev} \cdot e^{(-a(t-y))}$, wherein $m_{updated}$ is the updated impression total, a is a constant, t is the current time, and y is the impression update time.

Similarly, in one embodiment, the decay module 304 decays the positive interaction total according to the following formula:

$r_{updated} = r_{prev} \cdot e^{(-a(t-x))}$, wherein $r_{updated}$ is the updated positive interaction total, a is a constant, t is the current time, and x is the interaction update time.

The positive interaction module 306 updates the decayed positive interaction total based on the positive interaction tracked by the feedback module 204. After updating the positive interaction total, the positive interaction module 306 writes the updated total and the update time to the resonance database 108.

To update the decayed positive interaction total, the positive interaction module 306 queries the feedback module 204 and determines the type of interaction the user has committed with the content. Based on the determined interaction type, the positive interaction module 306 assigns an action weight to the interaction. The positive interaction module 306 retrieves the decayed positive interaction total from the decay module 304 and increments the decayed total by the action weight corresponding to the interaction.

In one embodiment, the positive interaction module 306 assigns an action weight to an interaction based on the level of user's interaction with the content. The more the interaction the greater the weight. For example, the positive interaction module 306 may define four types of weights: curiosity weight, awareness weight, intent weight and engagement weight. Amongst these four types of weight, in one embodiment, the engagement weight is the greatest, followed by intent weight, awareness weight and then curiosity weight. The interaction module 306 may assign hover view action curiosity weight and hashtag click action awareness weight. The positive interaction module 306 may also assign intent weight to URL click, profile click and screen name click. Additionally, actions like replying to the content's sender, marking the content as favorite or forwarding the content may be assigned an engagement weight by the positive interaction module 306. Such assignment of different levels of weight to different actions is beneficial in determining the content's resonance because such weight assignments account for the amount of engagement a particular user displays with the content.

After the decayed positive interaction total is incremented with appropriate action weight, the incremented total is used to determine the content's resonance as described below. Additionally, the positive interaction module 306 updates the resonance database 108 with the updated total. The positive interaction module 306 also updates the interaction update time as the current time in the resonance database 108. The updated positive interaction total and interaction update time beneficially enable various content servers 104 to synchronize with each other. The updated total and update time is later read by a positive interaction module 306 in another content server 104. The other content server 104 updates the read total and time based on the positive interaction of another user tracked by that content server 104. In this manner, each content server 104 reads the value of positive interaction total from the resonance database 108 and updates the read value based on the positive interaction tracked by that particular server. Accordingly, the load of updating the positive interaction total is distributed amongst various content servers 104. Moreover, because each content server 104 reads and updates the same data variables from the resonance database 108, the positive interaction total and the interaction update time variables account for positive interactions tracked by all content servers 104 collectively.

Because each individual content server 104 determines the content's resonance based on these variables, the individually determined resonance on each server 104 accounts for the feedback from the other content servers 104. Accordingly, the determination of resonance made by each content server 104 is synchronized with the resonance determination made by other content servers 104. Although synchronized, the resonance values determined by two different content servers 104 need not be identical because each content server accounts for different positive interactions it tracks. Because the positive interactions tracked by two content servers 104 need not be identical, the resonance values determined by the two content servers need not be identical either.

The total impressions module 308 retrieves the decayed impression total from decay module 304 and updates the decayed impression total to account for the impression tracked by the feedback module 206. Next, the incremented total is used to determine the content's resonance as described below. Additionally, the total impressions module 308 updates the resonance database 108 with the updated impression total. The total impressions module 308 also updates the impression update time as the current time in the resonance database 108. Like the updated positive interaction total and the interaction update time, the updated impression total and impression update time enable content servers to synchronize with each other.

The resonance score module 310 determines the content's resonance based on the decayed and updated positive interaction total and impression total. In one embodiment, the resonance is determined based on the following formula: $s=\max\{((r+1)\div(m+2)), 1\}$, wherein s is resonance, r is the updated positive interaction and m is the updated impression total.

The uncertainty module 312 accounts for the uncertainty caused by a small dataset associated with content. If the content has not been served to a predetermined number of users, the impression total and positive interaction total are not big enough to adequately indicate the content's resonance. To counterbalance the adverse effects of small impression total and positive interaction total, the uncertainty module 310 adjusts the content's resonance based on the total number of impressions for all the content that has the same type as the content whose resonance is being determined. Content may be classified as belonging to the same type based on various criteria like keywords associated with the content. In one embodiment, the adjusted resonance is determined based on the following formula: $s=\max\{((r+1)\div(m+2)), 1\}+(\ln(M+1)/2(m+2))^{1/2}$, wherein s is resonance, r is the updated positive interaction, m is the updated impression total and M is the total number of impressions for all the content that has the same type as the content whose resonance is being determined.

Resonance Determination Methodology

Figure 4:
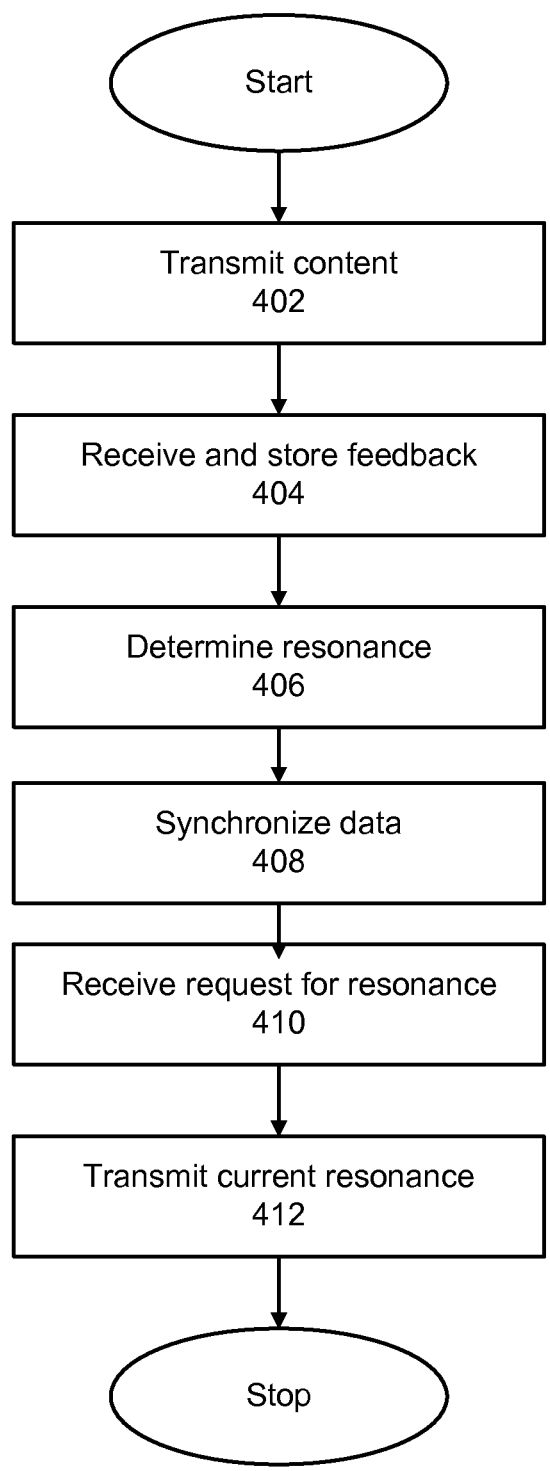
FIG. 4 is a flow diagram illustrating a method for transmitting resonance for content in response to a request for content's resonance according to one embodiment of the present disclosure.

FIG. 4 is a flow diagram illustrating a method for transmitting resonance for content in response to a request for content's resonance according to one embodiment of the present disclosure. The content server 104 transmits 402 content to content user clients 106 and receives 404 feedback regarding the users' interaction with the content. Based on the received feedback, the content server 104 updates the content's positive interaction total and impression total. The content server 104 then determines 406 the content's resonance based on the updated positive interaction total and impression total. The method for determining the content's resonance based on positive interaction total and impression total is further described below with FIG. 5. Next, the content server 104 writes 408 the updated total in resonance database 108. The content server 104 then receives 410 a request from resonance client 110 for content's resonance and the content server 104 transmits 412 the determined resonance to the resonance client.

Figure 5:
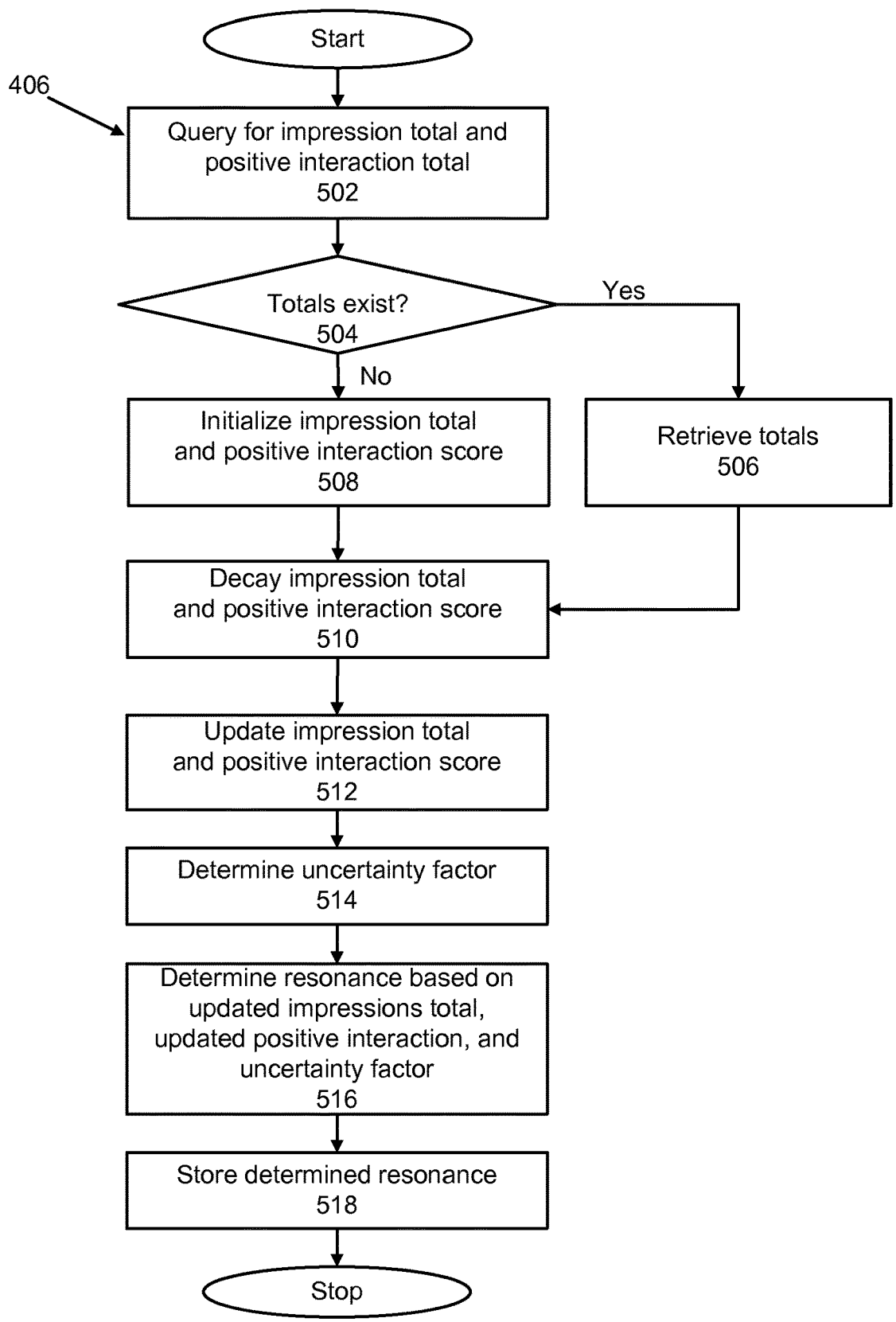
FIG. 5 is a flow diagram illustrating a method for determining resonance according to one embodiment of the present disclosure.

FIG. 5 is a flow diagram illustrating a method for determining resonance according to one embodiment of the present disclosure. The content server 104 queries 502 the resonance database 108 and determines 504 if the content has been previously served and if impression total and positive interaction score exist for the content. If not, the content server 104 initializes 508 the impressions total, the positive interaction score and their respective update times. If the totals already exist, the content server 104 retrieves 506 the totals and their respective update times. Next, the content server 104 decays 510 the impression total and positive interaction score and then updates 512 the impression total and positive interaction score based on the feedback received in step 404. The content server 104 determines 514 the uncertainty factor and determines 516 the resonance based on the updated impressions total, updated positive interaction score, and uncertainty factor. Subsequently, the content server 104 stores 518 the determined resonance.

Figure 6:
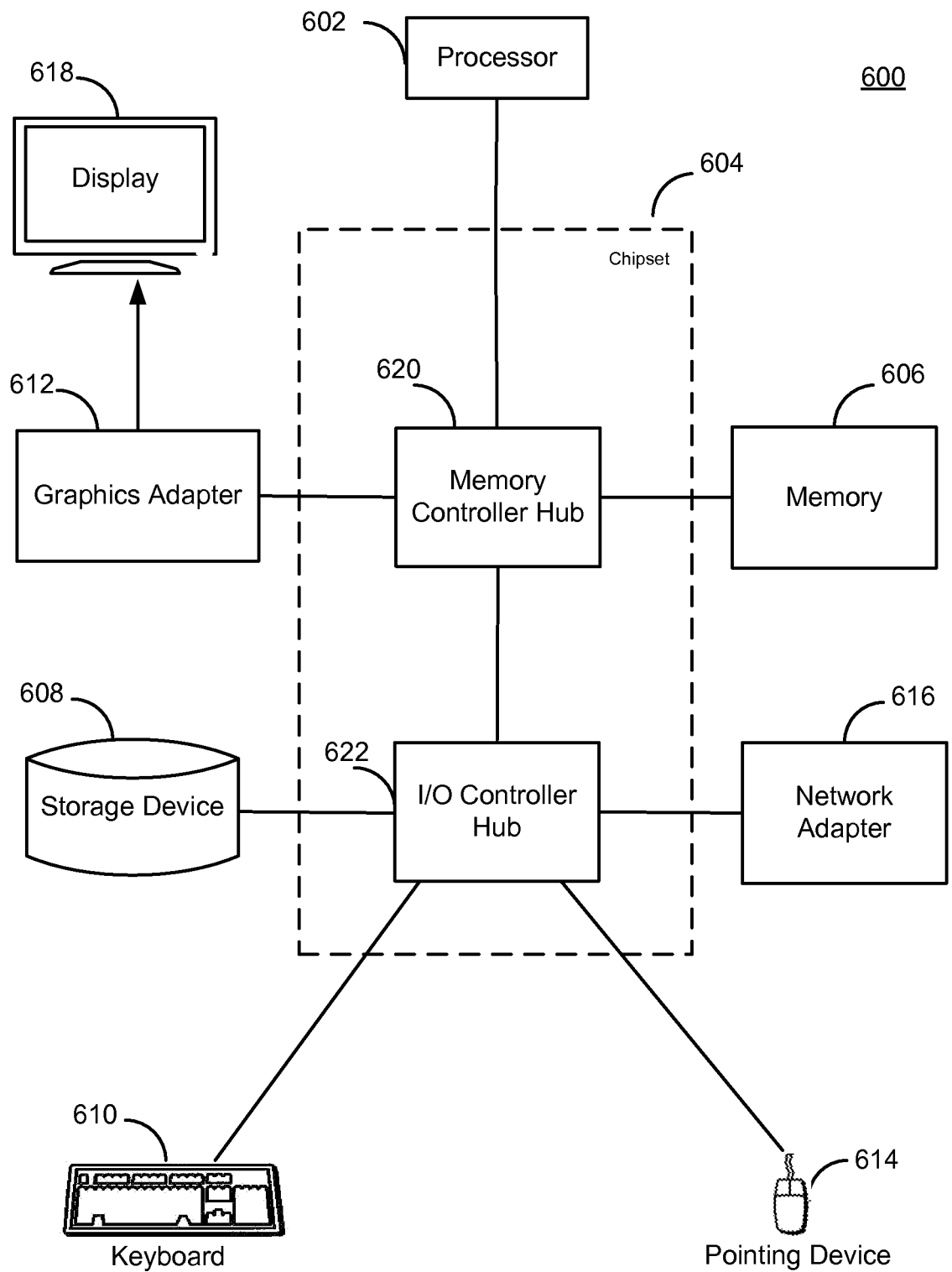
FIG. 6 is a block diagram illustrating an example of a computer for use in the computing environment shown in FIG. 1 according to one embodiment of the present disclosure.

The entities shown in FIGS. 1-5 are implemented using one or more computers. FIG. 6 is a high-level block diagram illustrating an example computer 600. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIGS. 1-5 can vary depending upon the embodiment and the processing power required by the entity. For example, the content server 104 might comprise multiple blade servers working together to provide the functionality described herein. The computers 600 can lack some of the components described above, such as keyboards 610, graphics adapters 612, and displays 618.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 3-4, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system, like the ones described in FIGS. 2-3, may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

What is claimed is:

1. A computer-implemented method comprising:
providing a message to a plurality of user devices;
receiving, by a first content server, an indication of a first user engagement with the message at a first user device;
in response, obtaining, by the first content server from a resonance database, a first impression total for the message and a first user interaction total for the message;
receiving, by a second content server different than the first content server, an indication of a second user engagement with the message at a second user device;
in response, obtaining, by the second content server from the resonance database, the first impression total for the message and the first user interaction total for the message;
computing, by the first content server, a first updated impression total by adding an impression value for the message to a first decayed user impression total, the first decayed user impression total representing a time-based decay of the first impression total;
computing, by the second content server, a second updated impression total by adding the impression value for the message to a second decayed user impression total, the second decayed user impression total representing a time-based decay of the first impression total;
computing, by the first content server, a first updated user interaction total by adding a first action weight for the first user engagement to a first decayed user interaction total, the first decayed user interaction total representing a time-based decay of the first user interaction total;
computing, by the second content server, a second updated user interaction total by adding a second action weight for the second user engagement to a first decayed user interaction total, the first decayed user interaction total representing a time-based decay of the first user interaction total;
computing, by the first content server, a first resonance value of the message based on both the first updated impression total and the first updated user interaction total;
computing, by the second content server, a second resonance value of the message based on both the second updated impression total and the second updated user interaction total;
selecting, by the first content server from among a first plurality of messages, the message for distribution to one or more user devices based on respective resonance values computed for the first plurality of messages, the resonance values for the first plurality of messages including the first resonance value computed for the message; and selecting, by the second content server from among a second plurality of messages, the message for distribution to one or more user devices based on respective resonance values computed for the second plurality of messages, the resonance values for the second plurality of messages including the second resonance value computed for the message.

2. The method of claim 1, wherein the first resonance value of the message and the second resonance value of the message are different.

3. The method of claim 1, wherein the first updated impression total computed by the first content server is different than the second updated impression total computed by the second content server.

4. The method of claim 3, wherein the first content server computes the first updated impression total at a different time than the second content server computes the second updated impression total, whereby the first decayed user impression total is different than the second decayed user impression total.

5. The method of claim 3, wherein the first updated user interaction total computed by the first content server is different than the second updated user interaction total computed by the second content server.

6. The method of claim 5, wherein the first content server computes the first updated user interaction total using the first engagement, and the first engagement has a different engagement type than the second engagement used by the second content server to compute the second updated user interaction total.

7. The method of claim 5, wherein the first content server computes the first updated user interaction total at a different time than the second content server computes the second updated user interaction total.

8. The method of claim 1, wherein obtaining, by the second content server, the first impression total for the message and the first user interaction total for the message comprises obtaining the first impression total for the message and the first user interaction total for the message from memory that is local to the second content server.

9. The method of claim 1, further comprising distributing among a plurality of content servers the load of updating the first user interaction total in the resonance database.

10. The method of claim 1, wherein each respective action weight corresponds to a different type of user interaction with the message.

11. The method of claim 1, wherein computing the first resonance value of the message comprises computing a ratio of the first updated user interaction total to the first updated impression total.

12. The method of claim 1, wherein computing the first resonance value comprises computing the first resonance value without obtaining additional values from the resonance database.

13. A system comprising:
one or more computers and one or more storage devices storing instructions that are operable, when executed by the one or more computers, to cause the one or more computers to perform operations comprising:
providing a message to a plurality of user devices;
receiving, by a first content server, an indication of a first user engagement with the message at a first user device;
in response, obtaining, by the first content server from a resonance database, a first impression total for the message and a first user interaction total for the message;

receiving, by a second content server different than the first content server, an indication of a second user engagement with the message at a second user device;

in response, obtaining, by the second content server from the resonance database, the first impression total for the message and the first user interaction total for the message;

computing, by the first content server, a first updated impression total by adding an impression value for the message to a first decayed user impression total, the first decayed user impression total representing a time-based decay of the first impression total;

computing, by the second content server, a second updated impression total by adding the impression value for the message to a second decayed user impression total, the second decayed user impression total representing a time-based decay of the first impression total;

computing, by the first content server, a first updated user interaction total by adding a first action weight for the first user engagement to a first decayed user interaction total, the first decayed user interaction total representing a time-based decay of the first user interaction total;

computing, by the second content server, a second updated user interaction total by adding a second action weight for the second user engagement to a first decayed user interaction total, the first decayed user interaction total representing a time-based decay of the first user interaction total;

computing, by the first content server, a first resonance value of the message based on both the first updated impression total and the first updated user interaction total;

computing, by the second content server, a second resonance value of the message based on both the second updated impression total and the second updated user interaction total;

selecting, by the first content server from among a first plurality of messages, the message for distribution to one or more user devices based on respective resonance values computed for the first plurality of messages, the resonance values for the first plurality of messages including the first resonance value computed for the message; and selecting, by the second content server from among a second plurality of messages, the message for distribution to one or more user devices based on respective resonance values computed for the second plurality of messages, the resonance values for the second plurality of messages including the second resonance value computed for the message.

14. The system of claim 13, wherein the first resonance value of the message and the second resonance value of the message are different.

15. The system of claim 13, wherein the first updated impression total computed by the first content server is different than the second updated impression total computed by the second content server.

16. The system of claim 15, wherein the first content server is configured to compute the first updated impression total at a different time than the second content server computes the second updated impression total, whereby the first decayed user impression total is different than the second decayed user impression total.

17. The system of claim 15, wherein the first updated user interaction total computed by the first content server is different than the second updated user interaction total computed by the second content server.

18. The system of claim 17, wherein the first content server computes the first updated user interaction total using the first engagement, and the first engagement has a different engagement type than the second engagement used by the second content server to compute the second updated user interaction total.

19. The system of claim 17, wherein the first content server computes the first updated user interaction total at a different time than the second content server computes the second updated user interaction total.

20. The system of claim 13, wherein obtaining, by the second content server, the first impression total for the message and the first user interaction total for the message comprises obtaining the first impression total for the message and the first user interaction total for the message from memory that is local to the second content server.

21. The system of claim 13, wherein the operations further comprise distributing among a plurality of content servers the load of updating the first user interaction total in the resonance database.

22. The system of claim 13, wherein each respective action weight corresponds to a different type of user interaction with the message.

23. The system of claim 13, wherein computing the first resonance value of the message comprises computing a ratio of the first updated user interaction total to the first updated impression total.

24. The system of claim 13, wherein computing the first resonance value comprises computing the first resonance value without obtaining additional values from the resonance database.

25. One or more non-transitory computer storage media encoded with computer program instructions that when executed by one or more computers cause the one or more computers to perform operations comprising:

providing a message to a plurality of user devices;

receiving, by a first content server, an indication of a first user engagement with the message at a first user device;

in response, obtaining, by the first content server from a resonance database, a first impression total for the message and a first user interaction total for the message;

receiving, by a second content server different than the first content server, an indication of a second user engagement with the message at a second user device;

in response, obtaining, by the second content server from the resonance database, the first impression total for the message and the first user interaction total for the message;

computing, by the first content server, a first updated impression total by adding an impression value for the message to a first decayed user impression total, the first decayed user impression total representing a time-based decay of the first impression total;

computing, by the second content server, a second updated impression total by adding the impression value for the message to a second decayed user impression total, the second decayed user impression total representing a time-based decay of the first impression total;

computing, by the first content server, a first updated user interaction total by adding a first action weight for the first user engagement to a first decayed user interaction total, the first decayed user interaction total representing a time-based decay of the first user interaction total;

computing, by the second content server, a second updated user interaction total by adding a second action weight for the second user engagement to a first decayed user interaction total, the first decayed user interaction total representing a time-based decay of the first user interaction total;

computing, by the first content server, a first resonance value of the message based on both the first updated impression total and the first updated user interaction total;

computing, by the second content server, a second resonance value of the message based on both the second updated impression total and the second updated user interaction total;

selecting, by the first content server from among a first plurality of messages, the message for distribution to one or more user devices based on respective resonance values computed for the first plurality of messages, the resonance values for the first plurality of messages including the first resonance value computed for the message; and selecting, by the second content server from among a second plurality of messages, the message for distribution to one or more user devices based on respective resonance values computed for the second plurality of messages, the resonance values for the second plurality of messages including the second resonance value computed for the message.

26. The one or more non-transitory computer storage media of claim 25, wherein the first resonance value of the message and the second resonance value of the message are different.

27. The one or more non-transitory computer storage media of claim 25, wherein the first updated impression total computed by the first content server is different than the second updated impression total computed by the second content server.

28. The one or more non-transitory computer storage media of claim 27, wherein the first content server computes the first updated impression total at a different time than the second content server computes the second updated impression total, whereby the first decayed user impression total is different than the second decayed user impression total.

29. The one or more non-transitory computer storage media of claim 27, wherein the first updated user interaction total computed by the first content server is different than the second updated user interaction total computed by the second content server.

30. The one or more non-transitory computer storage media of claim 29, wherein the first content server computes the first updated user interaction total using the first engagement, and the first engagement has a different engagement type than the second engagement used by the second content server to compute the second updated user interaction total.

31. The one or more non-transitory computer storage media of claim 29, wherein the first content server computes the first updated user interaction total at a different time than the second content server computes the second updated user interaction total.

32. The one or more non-transitory computer storage media of claim 25, wherein obtaining, by the second content server, the first impression total for the message and the first user interaction total for the message comprises obtaining the first impression total for the message and the first user interaction total for the message from memory that is local to the second content server.

33. The one or more non-transitory computer storage media of claim 25, wherein the operations further comprise distributing among a plurality of content servers the load of updating the first user interaction total in the resonance database.

34. The one or more non-transitory computer storage media of claim 25, wherein each respective action weight corresponds to a different type of user interaction with the message.

35. The one or more non-transitory computer storage media of claim 25, wherein computing the first resonance value of the message comprises computing a ratio of the first updated user interaction total to the first updated impression total.

36. The one or more non-transitory computer storage media of claim 25, wherein computing the first resonance value comprises computing the first resonance value without obtaining additional values from the resonance database.

* * * * *